United States Patent [19]

Fisinin et al.

[11] Patent Number: 4,947,802

[45] Date of Patent: Aug. 14, 1990

[54] APPARATUS FOR VACUUM CONVEYANCE AND AEROSOL TREATMENT OF POULTRY

[75] Inventors: Vladimir I. Fisinin; Vladimir I. Filonenko; Viktor G. Shol; Anatoly M. Balakhonov; Anatoly P. Tolkachev; Sergei A. Vorobiev, all of Moskovskaya, U.S.S.R.

[73] Assignee: Vsesojuzny Nauchno-Issledovateisky, Moskovskaya, U.S.S.R.

[21] Appl. No.: 317,635

[22] Filed: Mar. 1, 1989

[30] Foreign Application Priority Data

Mar. 4, 1988 [SU] U.S.S.R. ............... 438773[I]
Jul. 11, 1988 [SU] U.S.S.R. ............ 4445005[I]

[51] Int. Cl.⁵ .................... A01K 29/00; B65G 53/00
[52] U.S. Cl. ................................. 119/160; 119/156; 406/46; 128/200.14
[58] Field of Search ............... 119/156, 160, 154, 155, 119/1, 22, 82; 128/200.14; 406/46–49

[56] References Cited

U.S. PATENT DOCUMENTS 2,736,121  2/1956  Kimmerle ............... 406/46
3,767,268 10/1973  Stucky ..................... 119/82
4,232,632 11/1980  Kice ........................ 119/82
4,674,490  6/1987  Frankel et al. ......... 119/160

FOREIGN PATENT DOCUMENTS 1055712 11/1983 U.S.S.R. .

Primary Examiner—John Weiss
Attorney, Agent, or Firm—Ladas & Parry

[57] ABSTRACT

An apparatus for vacuum conveyance and aerosol treatment of poultry has a receiving pipeline which is mounted to extend in an inclined position and connected to an elevator pipe having openings for communication with a vacuum chamber which is connected to a vacuum source and to a discharge pipe. The vacuum source have a vacuum pipe and a pressure pipe. An aerosol chamber having an aerosol generator is provided in a starting portion of the receiving pipeline and communicates with the pressure pipe of the vacuum source. A base of the aerosol chamber is formed by the inner surface of the receiving pipeline. An adapter portion between the receiving pipeline and the aerosol chamber on the side of the elevator pipe is in the form of a flare pipe.

5 Claims, 1 Drawing Sheet

4,947,802

APPARATUS FOR VACUUM CONVEYANCE AND AEROSOL TREATMENT OF POULTRY

FIELD OF THE ART

The invention relates to apparatuses for vacuum conveyance and administration of gaseous veterinary medicines into animal bodies, in particular, to apparatuses for aerosol treatment of poultry.

The present invention may be most advantageously used in the poultry farming and, in particular, for veterinary treatment of poultry with aerosols of veterinary medicines.

BACKGROUND OF THE INVENTION

Known in the art is an apparatus for vacuum conveyance of hens (U.S. Pat. No. 4,232,634), comprising a receiving pipeline connected to an elevator pipe, a vacuum source and a discharge pipe having vacuum valves.

The employment of this apparatus makes it possible to carry out conveyances of poultry along pipes during discharge from a poultry house.

However, this apparatus does not make it possible to carry out aerosol treatment of poultry with veterinary medicines. The aerosol treatment is carried out in an individual chamber having an aerosol generator. When such an apparatus is used, consumption of veterinary medicines is rather high, and the treatment takes a long time.

Known in the art is an apparatus for vacuum conveyance of live hens (SU, A, No. 1055712), comprising a receiving pipeline connected to an elevator pipe having openings for communication with a vacuum source having vacuum and pressure pipes and with a discharge pipe having vacuum valves.

This apparatus does not make it possible to carry out aerosol treatment of poultry. The aerosol treatment is carried out in an individual apparatus in the form of a chamber of 40 to 60 m$^3$ capacity. Crates containing chicks are placed along walls in a staggered pattern, and an aerosol generator is placed at the center, at a height of 1.5 m above the floor level, the aerosol being sprayed during 25 to 30 minutes with a 25-30-minute cure in the aerosol. The chamber is then ventilated, and the crates containing poultry are removed.

When this apparatus is used, a substantial quantity of veterinary medicines is deposited on the floor and walls of the chamber, on the crates containing the poultry and is also removed from the chamber during its ventilation. In addition, it takes much time to treat the poultry in such an apparatus.

SUMMARY OF THE INVENTION

It is an object of the invention to provide for aerosol treatment of poultry during vacuum conveyance with minimum consumption of veterinary medicines.

Another object of the invention is to cut down the treatment time.

This object is accomplished by that in an apparatus for aerosol treatment of poultry, comprising a receiving pipeline connected to an elevator pipe having openings for communication with a vacuum chamber connected to a vacuum source which has vacuum and pressure pipes and to a discharge pipe having vacuum valves, and an aerosol chamber having an aerosol generator, according to the invention, the aerosol chamber is provided in a starting portion of the receiving pipeline and communicates with the pressure pipe of the vacuum source, the aerosol chamber having a base which is formed by the inner surface of the pipe of the receiving pipeline which extends in an inclined position for movement of poultry therealong, and an adapter portion between the receiving pipeline and the aerosol chamber on the side of the elevator pipe is in the form of a flare pipe.

The aerosol chamber preferably communicates with the pressure pipe of the vacuum source through at least one port of the flare pipe.

At least one port of the flare pipe preferably communicates with the pressure pipe of the vacuum source through an auxiliary chamber defined by the flare pipe and a partition wall provided in the aerosol chamber to extend along a wider extremity of the flare pipe.

It is also preferred that the pressure pipe of the vacuum source communicate with atmosphere through a regulator and a filter.

The provision of the aerosol chamber in the starting portion of the receiving pipeline makes it possible to carry out vacuum conveyance of poultry and thereby to prevent the major part of conveying air from flowing through the aerosol chamber.

The fact that the aerosol chamber communicates with the pressure pipe of the vacuum source allows aerosol escape with veterinary medicines to atmosphere to be reduced. The use of the inner surface of the receiving pipeline as the base of the aerosol chamber in combination with the inclined position of the receiving pipeline ensures slippage of poultry therealong under gravity. In order to avoid injuries of poultry upon its escape from the aerosol chamber, the adapter portion between the chamber and the pipeline is in the form of a flare pipe. In fact that at least one port of the flare pipe communicates with the pressure pipe of the vacuum source through an auxiliary chamber makes it possible to avoid mixing of the air from the pressure pipe with aerosol mist in the aerosol chamber; moreover, the air escaping from the port of the flare pipe presses the poultry from the top so as to facilitate its flow. The fact that the pressure pipe of the vacuum source communicates with atmosphere through a regulator and a filter makes it possible to release an excess of air from the apparatus thus cleaning it from aerosol of veterinary medicines.

Accordingly, the possibility is provided of carrying out aerosol treatment of poultry during vacuum conveyance with minimized duration of treatment and consumption of veterinary medicines.

BRIEF DESCRIPTION OF THE DRAWINGS

The invention will now be described in greater detail with reference to a specific embodiment thereof illustrated in the accompanying drawings, in which.

DETAILED DESCRIPTION OF THE INVENTION

Figure 1:
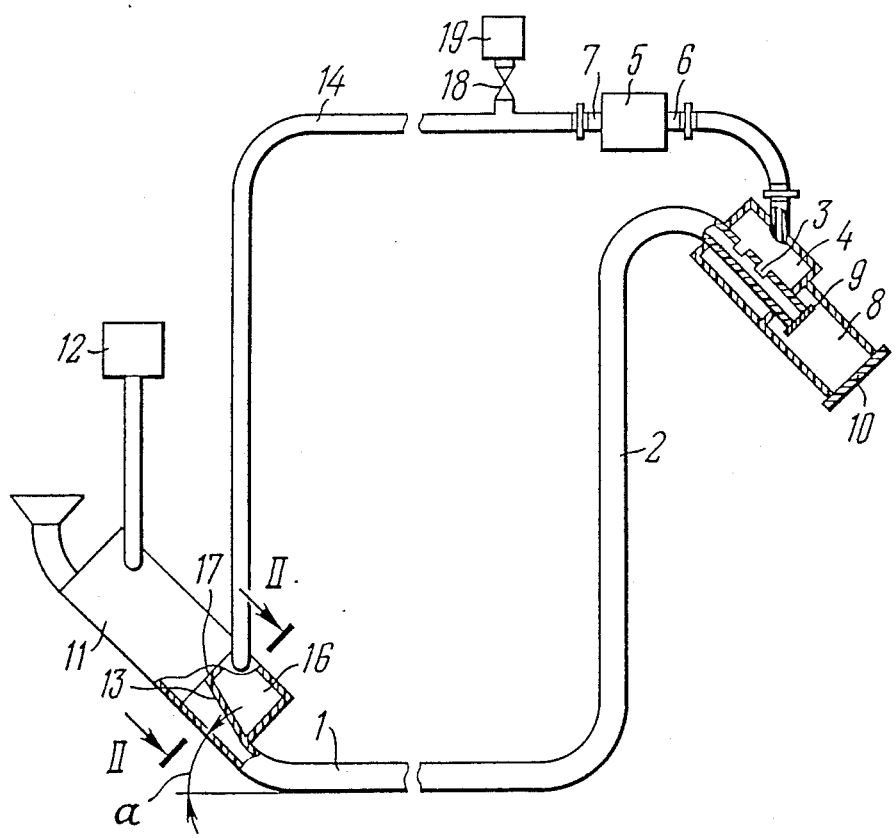
FIG. 1 schematically shows an apparatus for vacuum conveyance and aerosol treatment of poultry.

An apparatus for vacuum conveyance and aerosol treatment of poultry comprises a receiving pipeline 1 (FIG. 1) connected to an elevator pipe 2 having openings 3 for communication with a vacuum chamber 4 connected to a vacuum source 5 which is provided with vacuum and pressure pipes 6, 7, respectively, and with a discharge pipe 8 having vacuum valves 9 and 10. At a starting portion of the receiving pipeline 1 there is provided an aerosol chamber 11 having an aerosol generator 12, the base of the chamber being formed by the inner surface of the receiving pipeline 1. The portion of the receiving pipeline 1 in which the aerosol chamber 11 is provided is mounted to extend in an inclined position at an angle ($\alpha$) to the horizon which is equal to 40°. An adapter portion between the receiving pipeline 1 and the aerosol chamber 11 on the side of the elevator pipe 2 is in the form of a flare pipe 13, and the aerosol chamber communicates through a pipeline 14 with the pressure pipe 7 of the vacuum source 5.

Figure 2:
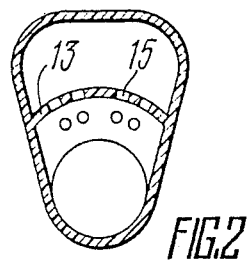
FIG. 2 is a sectional view taken along line II—II in FIG. 1.

The aerosol chamber 11 communicates with the pressure pipe 7 of the vacuum source 5 through at least one port 15 (FIG. 2) of the flare pipe which communicates with the pressure pipe 7 (FIG. 1) of the vacuum source 5 through an auxiliary chamber 16 defined by the flare pipe 13 and a partition wall 17 provided in the aerosol chamber 11 along a wider extremity of the flare pipe 13. In this embodiment of the apparatus, the ports 15 are provided in the flare pipe 13 in such a manner that their total are should be commensurable with the cross-sectional area of the pressure pipe 7 of the vacuum source 5. The pressure pipe 7 of the vacuum source 5 communicates with atmosphere through a regulator 18 and a filter 19.

The apparatus, according to the invention, functions in the following manner.

The aerosol generator 12 (FIG. 1) is charged with a solution of a veterinary medicine. Then the vacuum source 5 and the generator 12 are turned on. The apparatus is controlled by discharging a part of air from the pressure pipe 7 of the vacuum source 5 into atmosphere through the filter 19 by means of the regulator 18. It should be noted that the amount of air admitted to the aerosol chamber 11 through the pipeline 14 from the pressure pipe 7 of the vacuum source 5 is such that aerosol should not escape from the aerosol chamber 11 without, however, allowing a substantial amount of fresh air to be sucked in the aerosol chamber 11. A concentrated aerosol is produced in the aerosol chamber 11, and a part of it gets into the apparatus for vacuum conveyance, the apparatus functioning substantially in a closed-circuit pattern.

During conveyance, chicks are loaded into the aerosol chamber 11 after taking them out of an incubator house or after sorting out on the floor, the chicks slipping along the inner surface of the receiving pipeline 1 and moving along the pipelines 1 and 2 where they inhale the aerosol of a veterinary medicine. At the outlet from the aerosol chamber, the chicks pass freely through the flare pipe 13 to get into the receiving pipeline 1 so as to avoid injuries. The escape of air from the pressure pipe 7 of the vacuum source 5 through the ports 15 (FIG. 2) of the flare pipe 13 also contributes to the facilitated passage of the poultry. The chick are then admitted through the elevator pipe 2 to the vacuum chamber 4 (FIG. 1) where they are relieved from reduced pressure through the openings 3 (FIG. 1) and open the valve 9 by inertia to get into the discharge pipe 8. At the same time, the valve 10 is shut off to maintain reduced pressure in the discharge pipe 8 so as to prevent a countercurrent air flow from getting into the system. After closure of the valve 9, the valve 10 is easily opened by the poultry moving by inertia.

Thus, aerosol treatment of poultry is carried out during its vacuum conveyance.

EFFECT OF THE INVENTION

The apparatus makes it possible to carry out treatment of poultry with aerosols of antibiotics, vaccines and vitamins during vacuum conveyance. The employment of the apparatus according to the invention makes it possible to cut down consumption of veterinary medicines by about a factor of three and to reduce the treatment time.

We claim:

1. An apparatus for the vacuum conveyance and aerosol treatment of poultry, comprising:
    an elevator pipe having a first and a second end, said second end being perforated about an outer surface;
    a receiving pipe mounted at one end of said first end of said elevator pipe so that an aerosol chamber, defined by an intermediate portion of said receiving pipe between said one end and an other end of said receiving pipe, is maintained in an inclined position with respect to a ground surface and communicates with said elevator pipe, said aerosol chamber having an input portion that communicates with said other end for the insertion of poultry into said aerosol chamber and an output portion having ports defined therein, said output portion communicates with said one end;
    an aerosol generator in fluid communication with said aerosol chamber to spray poultry within said aerosol chamber with an aerosol;
    a vacuum chamber in fluid communication with said perforated second end of said elevator pipe;
    a vacuum source communicating with said vacuum chamber through a vacuum pipe and communicating with said ports through a pressure pipe, said vacuum source creating a vacuum in said vacuum chamber that draws the poultry through said receiving and elevator pipes, and wherein said vacuum source discharges air into said aerosol chamber through said pressure pipe and said ports to prevent aerosol from escaping from said aerosol chamber; and
    a discharge pipe connected to said second end, said discharge pipe having vacuum valves allowing the poultry to be discharged from said apparatus.

2. The apparatus according to claim 1, further comprising an additional chamber connected to said outer portion so as to communicate with said aerosol chamber through said ports, and wherein said additional chamber is connected to said pressure pipe so as to be in fluid communication with said vacuum source.

3. The apparatus according to claim 2, wherein said output portion has a funnel-like shape that tapers towards said one end, said ports formed in a top wall of said output portion.

4. The apparatus according to claim 3 further comprising:
    a regulation means, in fluid communication with said pressure pipe, to regulate the air pressure in said apparatus; and
    a filter means, connected to said regulator, in fluid communication with the atmosphere.

5. The apparatus according to claim 4, wherein the total cross sectional area of said ports is commensurate with the cross sectional area of said pressure pipe.

* * * * *

UNITED STATES PATENT AND TRADEMARK OFFICE
CERTIFICATE OF CORRECTION

PATENT NO. : 4,947,802
DATED : Aug. 14, 1990
INVENTOR(S) : Vladimir I. Fisinin et al It is certified that error appears in the above-indentified patent and that said Letters Patent is hereby corrected as shown below:

On the title page
    Column 1, Item [30] Foreign Application Priority Data
line 1, please change "438773" to --4387773--.

Signed and Sealed this

Twenty-sixth Day of October, 1993

BRUCE LEHMAN

Attest:

Attesting Officer      Commissioner of Patents and Trademarks

UNITED STATES PATENT AND TRADEMARK OFFICE
CERTIFICATE OF CORRECTION

PATENT NO. : 4,947,802
DATED : August 14, 1990
INVENTOR(S) : Vladimir I. Fisinin, et. al.

It is certified that error appears in the above-indentified patent and that said Letters Patent is hereby corrected as shown below:

On the Title page, item [73], Assignee: should read as follows:
--Vsesojuzny nauchno-issledovatelsky i tekhnologichesky institut ptitsevodstva,-- and after "Moskovskaya," insert --oblast, Zagorsk,--.

Signed and Sealed this

Twenty-eighth Day of June, 1994

Attest:

BRUCE LEHMAN

*Attesting Officer*     *Commissioner of Patents and Trademarks*